United States Patent
Wadzinski

(10) Patent No.: US 8,887,480 B2
(45) Date of Patent: Nov. 18, 2014

(54) WALK POWER MOWER WITH HEIGHT OF CUT ADJUSTMENT SYSTEM HAVING SPRING ARM WITH REPLACEABLE LOCKING PIN

(71) Applicant: Chris A. Wadzinski, Inver Grove Heights, MN (US)

(72) Inventor: Chris A. Wadzinski, Inver Grove Heights, MN (US)

(73) Assignee: The Toro Company, Bloomington, MN (US)

(*) Notice: Subject to any disclaimer, the term of this patent is extended or adjusted under 35 U.S.C. 154(b) by 0 days.

(21) Appl. No.: 13/845,574

(22) Filed: Mar. 18, 2013

(65) Prior Publication Data

US 2013/0283747 A1 Oct. 31, 2013

Related U.S. Application Data

(62) Division of application No. 13/312,433, filed on Dec. 6, 2011, now Pat. No. 8,539,745.

(51) Int. Cl.
| | | |
|---|---|---|
| *A01D 34/00* | (2006.01) | |
| *A01D 34/68* | (2006.01) | |
| *A01D 43/063* | (2006.01) | |
| *A01D 34/685* | (2006.01) | |

(52) U.S. Cl.
CPC ............ *A01D 34/68* (2013.01); *A01D 43/0636* (2013.01); *A01D 34/685* (2013.01); *A01D 34/6806* (2013.01)
USPC .......................................................... 56/17.2

(58) Field of Classification Search
CPC ........................... A01D 34/74; A01D 2101/00
USPC .............. 280/43, 43.17, 43.24; 56/17.2, 17.4, 56/255, DIG. 2, 254, 320.1; 172/259; D15/14
See application file for complete search history.

(56) References Cited

U.S. PATENT DOCUMENTS

| | | | | |
|---|---|---|---|---|
| 2,818,270 | A | * | 12/1957 | Cataline ...................... 280/43.17 |
| 2,915,318 | A | | 12/1959 | Chesser |
| 3,043,604 | A | * | 7/1962 | Rehnberg et al. ............... 280/43 |
| 3,147,987 | A | | 9/1964 | Ritums |
| 3,178,874 | A | * | 4/1965 | Hanson et al. .................. 56/254 |
| 3,210,089 | A | * | 10/1965 | Hoffman et al. ................ 280/43 |
| 3,269,100 | A | * | 8/1966 | Smith ............................. 56/17.2 |
| 3,390,894 | A | * | 7/1968 | Olsen .......................... 280/43.17 |
| 3,421,776 | A | * | 1/1969 | Stockburger et al. ....... 280/43.17 |
| 3,428,328 | A | * | 2/1969 | Dickson et al. ............ 280/43.17 |
| 3,649,828 | A | * | 3/1972 | Price .......................... 280/43.17 |

(Continued)

FOREIGN PATENT DOCUMENTS

| | | |
|---|---|---|
| CA | 671157 | 9/1963 |
| GB | 1349813 | 4/1972 |

*Primary Examiner* — Árpád Fábián-Kovács
(74) *Attorney, Agent, or Firm* — James W. Willer

(57) ABSTRACT

A walk power mower has a mower deck that encloses a pair of rotary cutting blades with the grass clippings from the blades being discharged through a rearwardly extending grass discharge tunnel in a rear bagging mode of operation. The mower deck has ground engaging wheels that are vertically moved up or down to adjust the height of cut. The height of cut adjustment system comprises at least one spring arm having a locking pin or tab that cooperates with one of a plurality of notches, detents or openings on the mower deck to select a desired height of cut. A threaded fastener releasably attaches the locking pin or tab to the spring arm to be able to replace the locking pin or tab without replacing the entire spring arm.

3 Claims, 16 Drawing Sheets

(56) References Cited

U.S. PATENT DOCUMENTS

| | | | | |
|---|---|---|---|---|
| 3,677,574 A * | 7/1972 | Cyr | ............................ | 280/43.13 |
| 3,799,579 A * | 3/1974 | Dahl | ............................. | 280/762 |
| 4,041,679 A * | 8/1977 | Seifert et al. | .................. | 56/11.3 |
| 4,280,319 A * | 7/1981 | Scanland | ........................ | 56/255 |
| 4,321,785 A * | 3/1982 | Kaland | .......................... | 56/17.2 |
| 4,525,989 A * | 7/1985 | Lane et al. | ..................... | 56/17.4 |
| 4,899,524 A * | 2/1990 | Eilles | ............................ | 56/17.2 |
| 5,259,175 A * | 11/1993 | Schmidt | ......................... | 56/17.2 |
| 5,526,633 A * | 6/1996 | Strong et al. | ................... | 56/17.2 |
| 5,638,667 A * | 6/1997 | Ellson et al. | ................. | 56/320.1 |
| 5,638,668 A * | 6/1997 | Kallevig et al. | ............. | 56/320.1 |
| 5,749,209 A * | 5/1998 | Thomason | .................... | 56/17.2 |
| 5,816,033 A * | 10/1998 | Busboom et al. | ............. | 56/10.8 |
| 7,578,117 B2 * | 8/2009 | Shaffer et al. | ................. | 56/17.1 |

\* cited by examiner

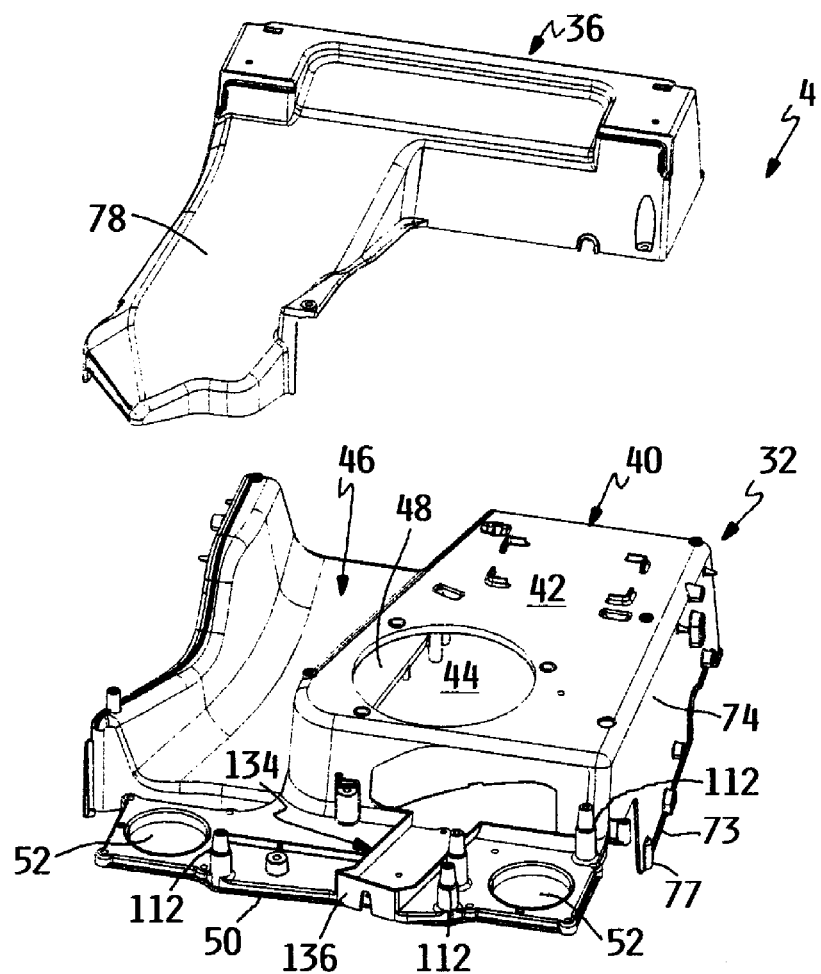
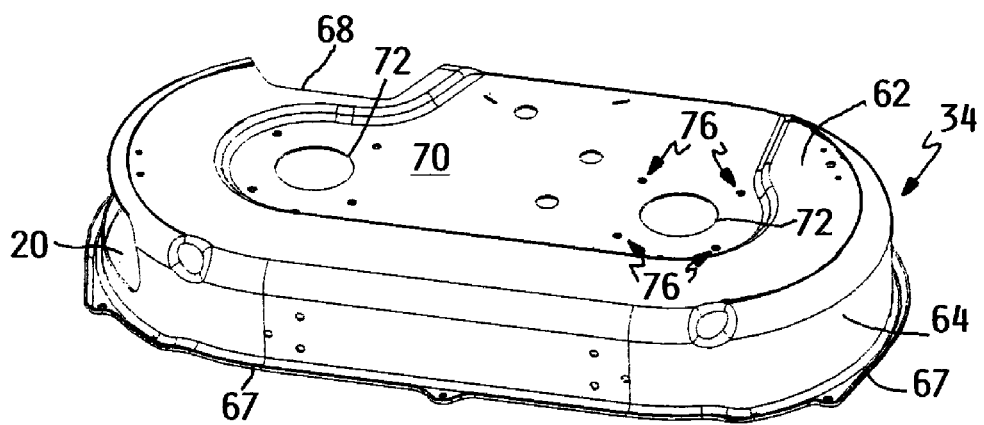
FIG. 7

WALK POWER MOWER WITH HEIGHT OF CUT ADJUSTMENT SYSTEM HAVING SPRING ARM WITH REPLACEABLE LOCKING PIN

CROSS REFERENCE TO RELATED APPLICATIONS

This application is a division of application Ser. No. 13/312,433 filed Dec. 6, 2011.

TECHNICAL FIELD

This invention relates to mowers and, more particularly, to walk power mowers which are operated by a user who walks on the ground behind the mower when operating the mower.

BACKGROUND OF THE INVENTION

Walk power mowers are well known for cutting grass. Such mowers are characterized by a relatively small mower deck, typically one that provides a 21" cutting width, which is supported by four wheels at the corners of the deck for rolling over the ground. The underside of the deck typically includes a substantially circular cutting chamber. The cutting chamber houses a single rotary cutting blade that rotates about a substantially vertical axis in a substantially horizontal cutting plane. A small internal combustion engine or electric motor is laterally centered on top of the mower deck. The shaft of the engine or motor extends down through the top wall of the mower deck into the cutting chamber to be attached to the cutting blade.

Many mowers of this type have a rear bagging mode in which the grass clippings are thrown into and collected within a bag that is releasably fastened to the rear of the mower deck. In such mowers, the cutting chamber has a rearwardly extending discharge tunnel that progressively increases in height as it extends rearwardly to accommodate the grass clippings. The tunnel ends in a rearwardly facing grass discharge opening that is mated to the open mouth of the bag. Desirably, the tunnel and the bag are positioned so that they do not extend beyond the lateral sides of the deck to allow the mower to cut close to the sides of various structures, e.g. to cut all the way up to a flower bed, retaining wall or the like.

Mowers of the type noted above have conventionally been restricted to single bladed mowers having the aforementioned small cutting width. If the cutting width could be dramatically increased from say 21" to 30" or so, the user could cut 50% more grass on each cutting swath of the mower. This would greatly increase productivity by decreasing the amount of time needed to mow a particular area of grass. However, such a larger walk power mower could be stored in one's garage in much less space than that required for storing a riding mower. Thus, the ease of storage and greater productivity offered by a wide swath, walk power mower would be an attractive and less expensive alternative to a riding mower.

Attempts have been made to provide larger walk power mowers having a pair of side-by-side cutting blades that offer a wider cutting swath than a single bladed mower. However, such mowers have not provided a true rear bagging capability in the same manner as that provided by a single bladed mower with a rearwardly extending discharge tunnel. Such dual bladed mowers typically have discharged the grass clippings to the sides of the mower deck. The Applicants believe this to be the result of a belief in the art that the increased volume of grass clippings resulting from the operation of two blades could not be accommodated in a single rearwardly extending tunnel given the need to position the engine over the center of the deck in front of the bag.

Another difficulty posed by dual bladed mowers is the orientation of the cutting blades relative to one another. The two cutting blades are normally positioned in one of two different ways: 1.) the blades can be set generally side-by-side relative to one another but staggered fore and aft relative to one another so that their cutting orbits overlap one another in the middle of the deck but do not intersect with one another, or 2.) the blades can be set entirely or directly side-by-side relative to one another with no longitudinal staggering and with their cutting orbits intersecting with one another. With the latter approach, it is necessary to time the rotation of the dual blades relative to one another using a timing belt so that the dual blades do not hit one another as they rotate. A timing belt system requires fairly high belt tension to avoid the belt from coming off the cogged timing pulleys. Such high belt tension can warp or deform the fairly light mower decks typically used in these types of mowers.

Accordingly, it would be an advance in the art to provide a dual bladed walk power mower that would offer a true rear bagging mode and yet be durable and affordable.

SUMMARY OF THE INVENTION

One aspect of this invention relates to a mower which comprises a mower deck having at least one rotary cutting blade. A plurality of ground engaging wheels is carried on the mower deck for supporting the mower deck for rolling over the ground. An upwardly and rearwardly extending handle assembly is carried on the mower deck to permit an operator who is walking on the ground behind the mower deck to grip the handle assembly to guide and manipulate the mower deck during movement of the mower deck. A power source is carried atop the mower deck for rotating the cutting blades. A height of cut adjustment system is provided for raising and lowering the wheels on the mower deck to adjust how far the at least one rotary cutting blade is positioned above the ground. The height of cut adjustment system comprises a plurality of notches, detents or openings provided in the mower deck. The height of cut adjustment system further comprises at least one spring arm that is resiliently biased towards the mower deck to move a locking pin or tab on the spring arm into engagement with a selected one of the notches, detents or openings with the height of cut being determined by which notch, detent or opening has been engaged by the locking pin or tab. The locking pin or tab is releasably coupled by a fastener to the spring arm such that the locking pin or tab can be replaced on the spring arm if the locking pin or tab is damaged without having to replace the spring arm.

BRIEF DESCRIPTION OF THE DRAWINGS

This invention will be described more completely in the following Detailed Description, when taken in conjunction with the following drawings, in which like reference numerals refer to like elements throughout.

FIG. 7 is a front perspective view of the components of the mower deck, namely of the engine mount, the deck shell and the deck shroud, that form the mower deck of the mower of FIG. 1, particularly illustrating the components in an exploded form;

DETAILED DESCRIPTION

Figure 1:
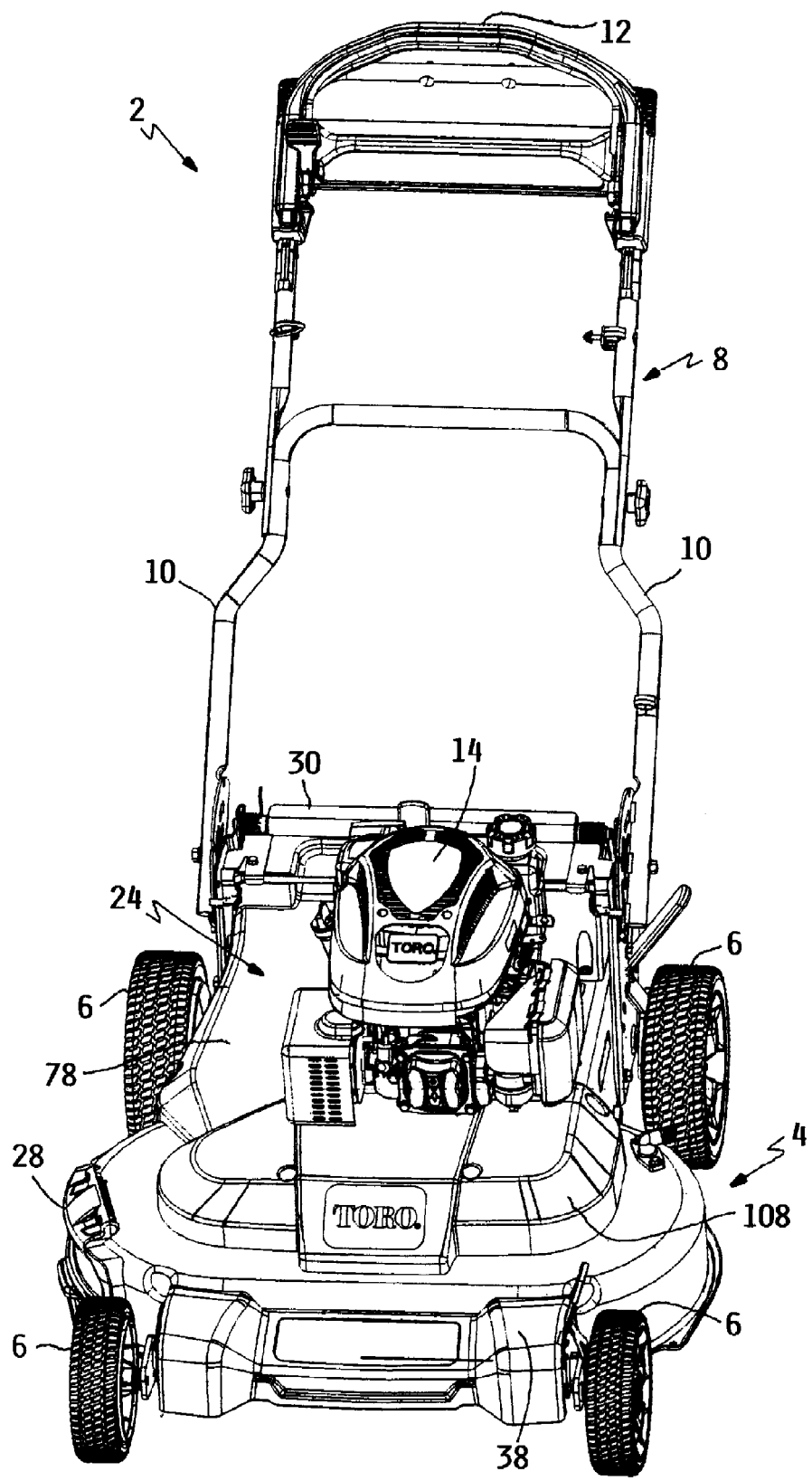
FIG. 1 is a front perspective view of one embodiment of a mower according to this invention, particularly illustrating the mower in a mulching mode.

A first embodiment according to this invention of a mower for cutting grass is generally illustrated as 2 herein. Mower 2 comprises a mower deck 4 supported for rolling over the ground by four rotatable, ground engaging wheels 6 carried at the four corners of deck 4. A U-shaped handle assembly 8 is attached to mower deck 4 comprising a pair of upwardly and rearwardly extending handle tubes 10 which are connected together at their upper ends by a substantially horizontal cross bar 12. Cross bar 12 is wide enough to allow a user who stands on the ground behind mower 2 to grip and hold cross bar 12 with both hands. Cross bar 12 can optionally slide up and down on handle tubes 10 to vary the ground speed of mower 2 as disclosed in the assignee's U.S. Pat. No. 6,082,083, which is hereby incorporated by reference.

A power source comprising an internal combustion engine 14 is mounted atop deck 4. Engine 14 powers a transmission (not shown) for propelling the rear wheels 6 of mower 2 to cause mower 2 to be self-propelled. Engine 14 also powers a pair of grass cutting blades 16 through a blade drive system 18. Any suitable transmission or wheel drive system could be used on mower 2 and need not be further discussed herein. However, blade drive system 18 comprises one aspect of this invention and will thus be described in more detail hereafter.

Figure 6:
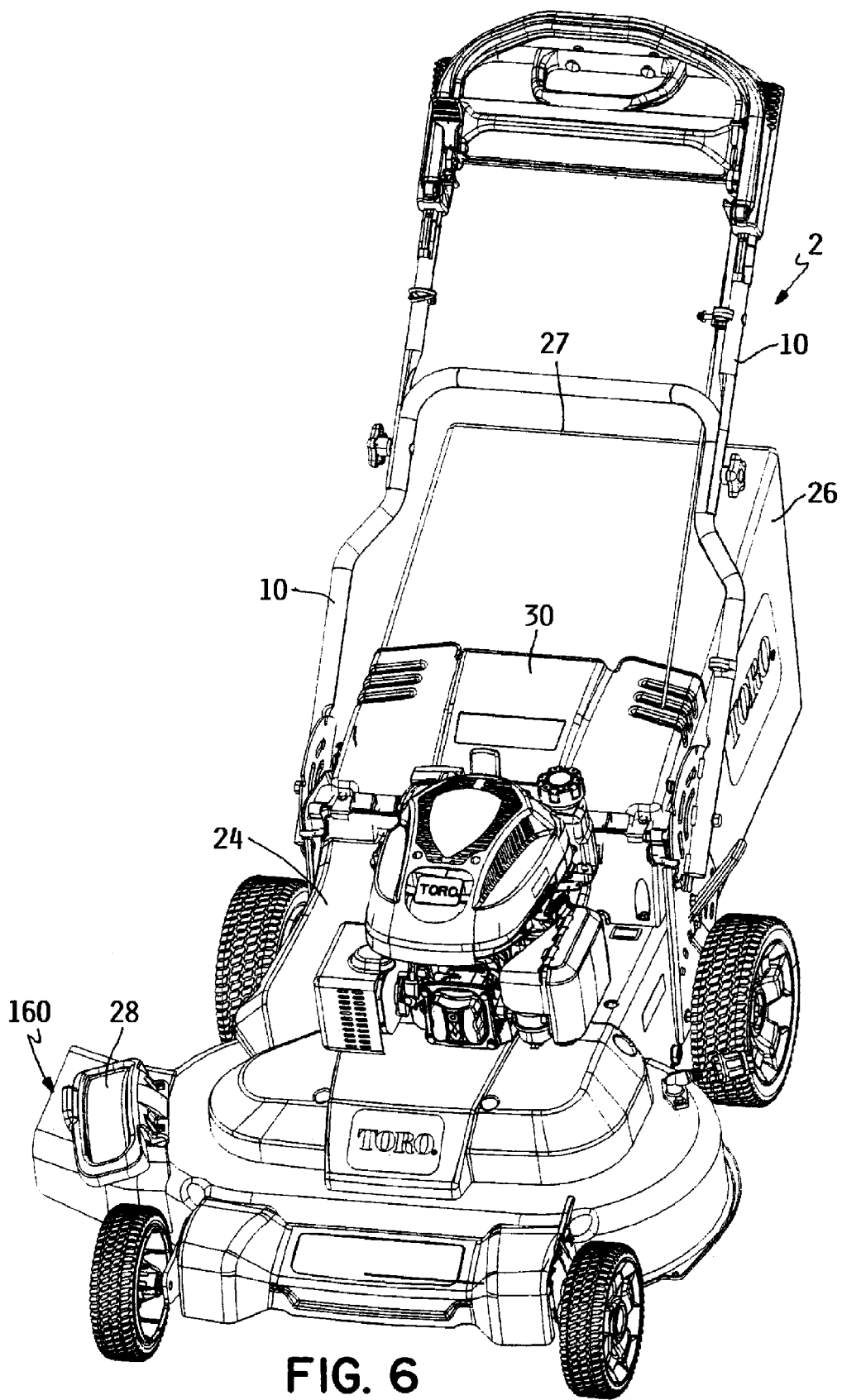
FIG. 6 is a perspective view of the mower of FIG. 1, but showing the mower with the side discharge opening having been opened with the side discharge chute in place, and also showing the rear bag having been installed at the rear of the mower in mating engagement with the rearwardly extending grass discharge tunnel, thereby illustrating both the side discharge and rear bagging modes of the mower.

Mower 2 operates either in a mulching mode, a side discharge mode, or a rear bagging mode. In the mulching mode, the grass clippings are confined within deck 4 until the clippings are forced or fall downwardly through an open bottom 66 of deck 4. In the side discharge mode, a side discharge opening 20 is open to allow the clippings to be thrown from mower 2 to one side of deck 4. Finally, in the rear bagging mode, a rear discharge opening 22 formed by the rear end of a rearwardly extending grass discharge tunnel 24 is open. This allows the clippings to be thrown through tunnel 24 and out through discharge opening 22 into a space that is laterally positioned between lower portions of handle tubes 10 when viewed from above as indicated by the tunnel discharge arrow S in FIG. 2. The clippings discharged from tunnel 24 are received in a grass collection bag 26 that has a mouth mated with rear discharge opening 22. As shown in FIG. 6, bag 26 extends substantially straight back in a rearward direction from mower deck 4 to terminate in a rear end 27 that lies beneath upper portions of handle tubes 10.

The user configures mower 2 for operation at any given time in only one of the three possible modes of operation. FIGS. 1-5 depict mower 2 configured for operation in the mulching mode. In the mulching mode, side discharge opening 20 is blocked by a pivotal side door 28 and tunnel 24 is blocked or closed by a pivotal rear door 30. Tunnel 24 can be additionally blocked by a removable mulch plug (not shown) that is inserted into tunnel 24 in the mulching mode. FIG. 6 shows side door 28 having been pivoted upwardly to open side discharge opening 20 with a side discharge chute 160 having been installed on side discharge opening 20. For convenience, FIG. 6 also shows rear door 30 having been pivoted upwardly to open tunnel 24 with bag 26 being mated to tunnel 24. While FIG. 6 has been used to show mower 2 as it would appear in both the side discharge and the rear bagging modes, it should be understood that both of these modes would not be used simultaneously, i.e. the user would pick either the side discharge mode or the rear bagging mode.

Referring now to FIGS. 7-10, three primary components comprise deck 4, i.e. an engine mount 32, a deck shell 34, and a rear deck shroud 36. These components are screwed or bolted together to form deck 4. As shown in FIGS. 1-5, deck 4 also includes a front bracket 38 that is secured or attached, e.g. bolted, to the front of deck shell 34. Front bracket 38 is used for mounting the front wheels 6 of mower 2 to deck 4. While front bracket 38 also is part of deck 4, it need not be described in as much detail as engine mount 32, deck shell 34 and rear shroud 36.

Turning first to FIG. 7, engine mount 32 is formed with a downwardly facing, U-shaped engine deck 40 having a top wall 42 that is provided with a large circular opening 44 for receiving the drive shaft (not shown) of engine 14. Engine 14 is mounted atop the top wall 42 of engine deck 40 over the drive shaft receiving opening 44 by being bolted to top wall 42 at various locations. In addition, engine mount 32 is formed with an upwardly facing U-shaped trough 46 immediately contiguous to an innermost sidewall 48 of engine deck 40. Innermost sidewall 48 of engine deck 40 also does double duty by serving as the innermost sidewall of trough 46. A substantially horizontal front apron 50 extends forwardly from the front of engine deck 40 and trough 46. Preferably, engine deck 40, trough 46 and apron 50 of engine mount 32 are collectively formed as a single, one-piece cast aluminum part having a wall thickness of approximately 140 thousandths of an inch (0.140") to provide great strength.

As shown in FIG. 7, apron 50 of engine mount 32 includes two relatively small circular openings 52 for receiving the upper ends of a pair of spindles 80 that mount cutting blades 16. Each opening 52 is surrounded by four threaded apertures 56. As will be explained in more detail hereafter, fasteners 86 will be tightened into apertures 56 to attach engine mount 32 to deck shell 34 and to a pair of bearing housings 82 which carry spindles 80.

Deck shell 34 is the part of deck 4 that forms a cutting chamber 60 which encloses blades 16. Shell 34 comprises an integral, one-piece stamped steel part having a wall thickness that is approximately one third thinner than the wall thickness of the cast aluminum engine mount 32, i.e. a wall thickness of approximately 90 thousandths of an inch (0.090") for shell 34. Shell 34 has a top wall 62 that is bounded by a peripheral, downwardly extending sidewall 64 to form cutting chamber 60. Cutting chamber 60 has an open bottom 66 that faces downwardly towards the ground. See FIG. 8. A circumferential lip 67 extends a short distance outwardly from a lower edge of sidewall 64.

Sidewall 64 of shell 34 is interrupted in two places to form side discharge opening 20 as well as a rear outlet 68. See FIGS. 15 and 16. A portion of outlet 68 is formed in sidewall 64 of shell 34 and a portion of outlet 68 is formed in top wall 62 of shell 34. Outlet 68 is mated to the inlet or entrance to tunnel 24 so that clippings generated within cutting chamber 60 pass upwardly from cutting chamber 60 of shell 34 through outlet 68 into the front end of tunnel 24. In addition, shell 34 includes a shallow recessed central portion 70 having a depth approximately equal to the wall thickness of apron 50. Central portion 70 includes two circular openings 72 that correspond in size, shape and relative location to circular openings 52 in apron 50 of engine mount 32. Circular openings 72 are each surrounded by four smooth apertures 76.

Apron 50 of engine mount 32 can be nested down within recessed central portion 70 when engine mount 32 and shell 34 are assembled together with circular openings 52, 72 in both parts and surrounding apertures 56, 76 being superimposed on top of one another. In addition, engine mount 32 wraps closely around the rear face of peripheral sidewall 64 with the front ends of lower edges 73 of the sidewalls 74 of engine mount 32 engaging at two spaced locations atop the rear side of lip 67 of shell 34. See FIGS. 7 and 8. Apertures are provided in lip 67 at these locations that are aligned with threaded bosses 77 on sidewalls 74 to provide a pair of attachment points between engine mount 32 and shell 34 that are in addition to the eight other attachment points provided collectively by the superimposed apertures 56, 76.

Figure 8:
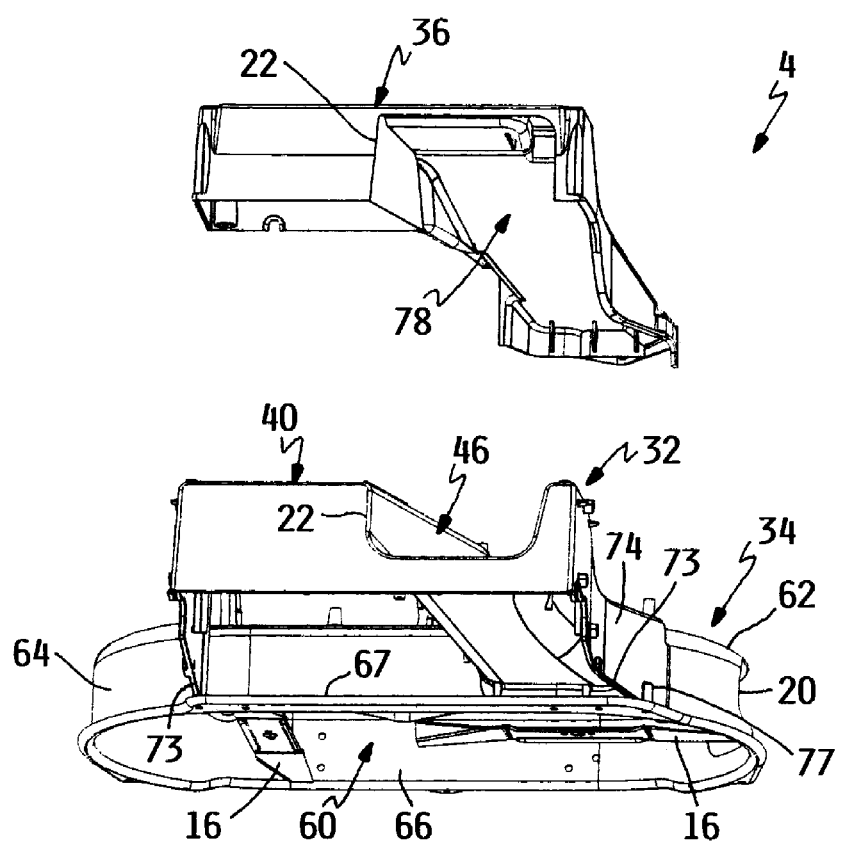
FIG. 8 is a rear perspective view showing the deck of FIG. 7 with the deck shroud having been exploded away from the assembled engine mount and deck shell.

As best shown in FIGS. 7 and 8, deck shroud 36 is L-shaped having a U-shaped, downwardly facing channel 78 along one side of shroud 36. Channel 78 in shroud 36 is substantially the same size and shape as trough 46 in engine mount 32. When shroud 36 is screwed or bolted to engine mount 32, trough 46 in engine mount 32 and channel 78 in shroud 36 together form tunnel 24. Trough 46 forms the lower portion of tunnel 24 and channel 78 forms the upper portion of tunnel 24. Shroud 36 preferably comprises an integral, one-piece molded plastic part.

Figure 5:
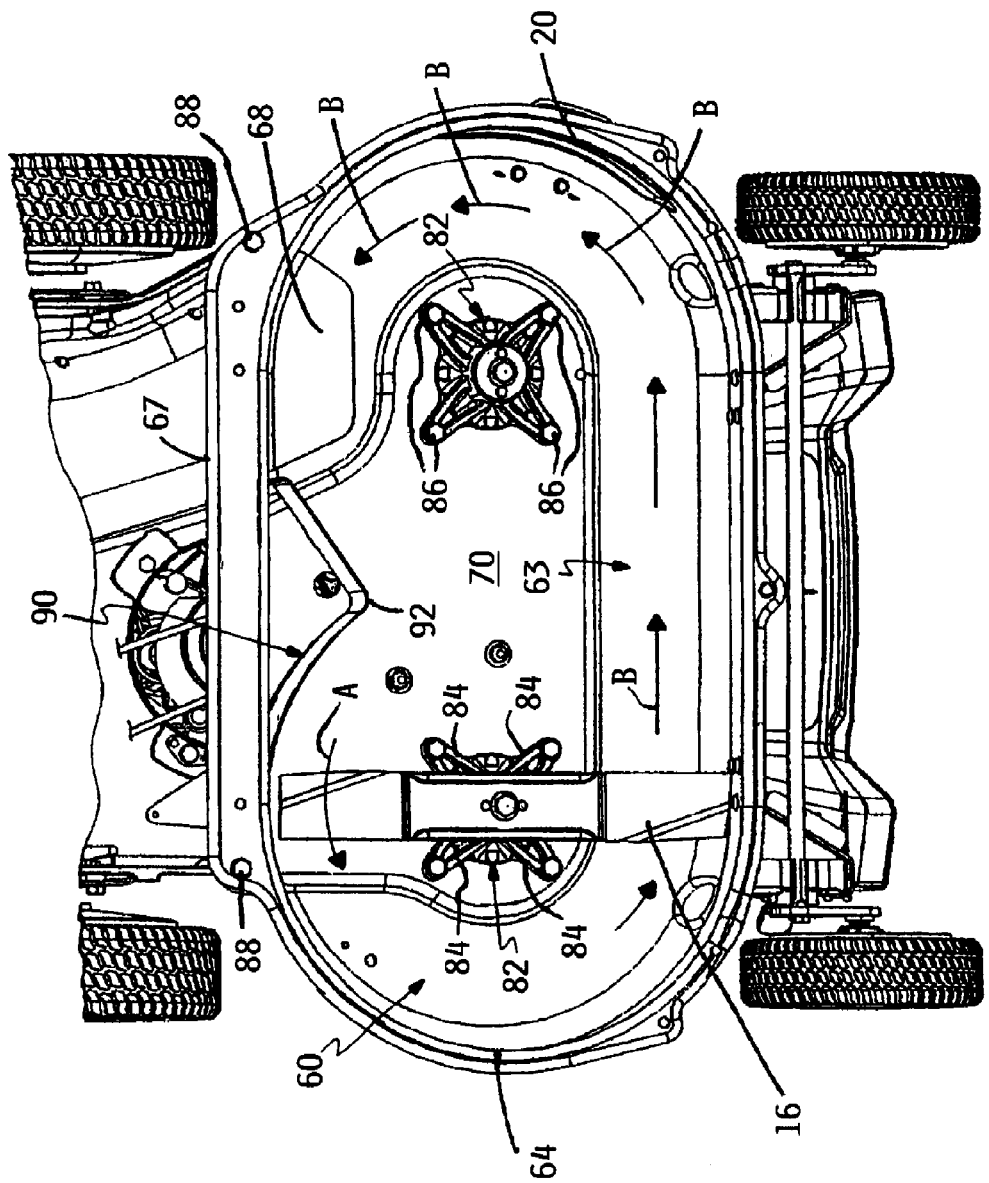
FIG. 5 is a perspective view of a portion of the underside of the mower of FIG. 1.
Figure 10:
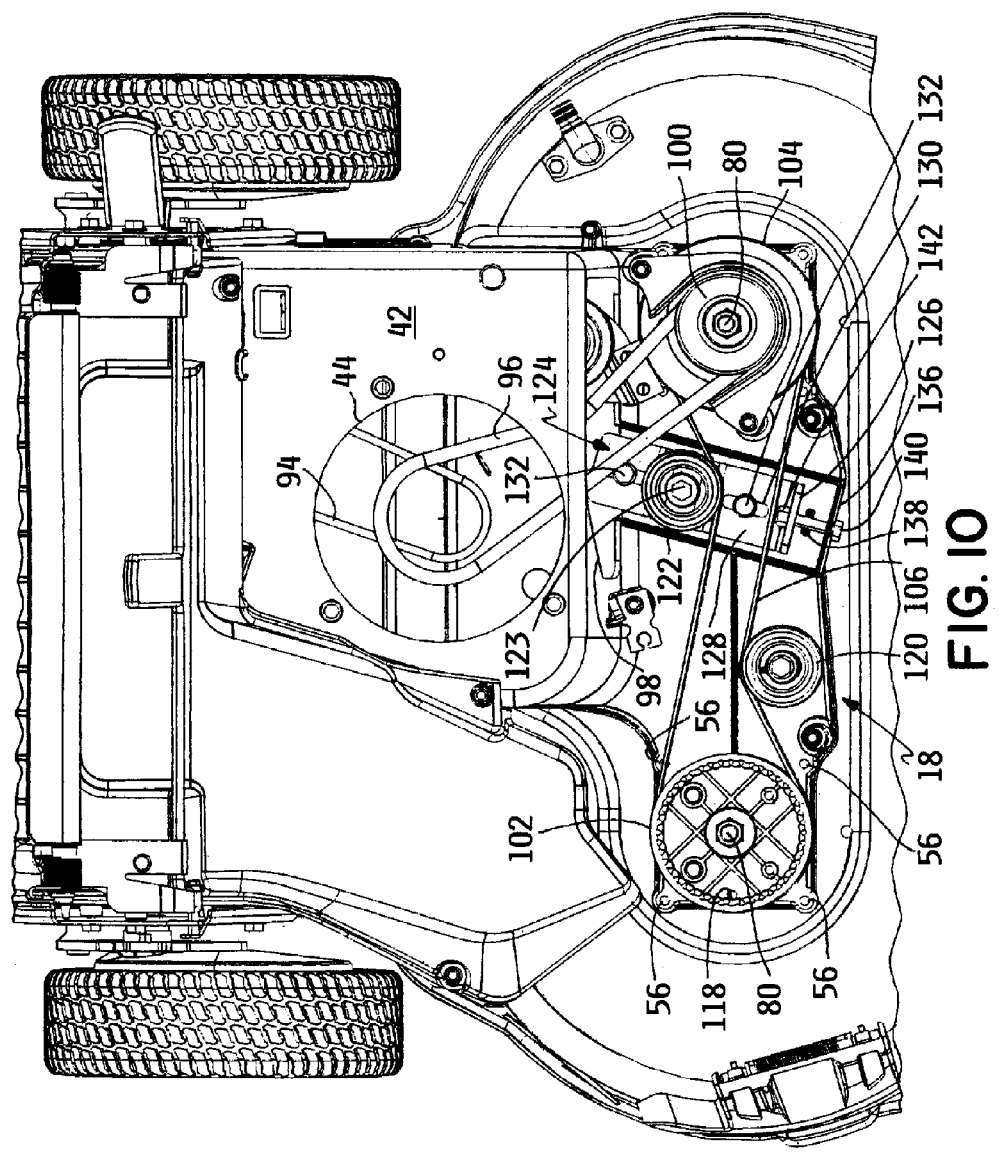
FIG. 10 is a top plan view of a portion of the mower of FIG. 1, particularly illustrating the blade drive system comprising the dual cogged drive pulleys and the timing belt entrained around such drive pulleys.

Referring now to FIGS. 5 and 10, two spindles 80 extend into cutting chamber 60 with blades 16 being bolted to bottom ends of spindles 80. Spindles 80 are rotatably supported by bearings (not shown) contained within bearing housings 82. Each bearing housing 82 is cast from metal as a single piece. In addition, each bearing housing 82 has four outwardly extending mounting arms 84 containing apertures at the ends of arms 84. The apertures at the end of arms 84 have the same spacing and orientation as apertures 56, 76 in top wall 62 of shell 34 and in apron 50 of engine mount 32.

In assembling deck 4 from its primary components, bearing housings 82 are installed in cutting chamber 60 of shell 34 with arms 84 abutting the underside of top wall 62 of shell 34. Engine mount 32 is laid on top wall 62 of shell 34 with apron 50 being received in recessed portion 70. Threaded fasteners 86, such as machine bolts, are then passed up through the apertures at the ends of arms 84 on each bearing housing 82 and through the aligned apertures 76, 56 to be screwed upwardly into the four threaded apertures 56 on engine mount 32. When fasteners 86 are tightened into apertures 56, spindles 80 carried in bearing housings 82 are each securely bolted to the relatively thick, cast aluminum apron 50 of engine mount 32 with the stamped steel top wall 62 of shell 34 being tightly sandwiched between apron 50 and bearing housings 82. This provides a very strong and durable structure for deck 4 that is sufficient for withstanding relatively high tension in the drive belt used to power spindles 80 without warping deck 4. This strength and durability is further enhanced by the two additional fasteners 88 that bolt lower edges 73 of sidewalls 74 of engine mount 32 to lip 67 of shell 34. See FIG. 5.

Blades 16 are arranged side-by-side relative to one another with the orbits of the tips of blades 16 intersecting one another along the middle of shell 34. As best shown in FIG. 8, blades 16 are oriented at right angles relative to one another which orthogonal orientation is maintained by blade drive system 18 so that blades 16 do not hit one another as they rotate. Referring to FIG. 5, blade drive system 18 rotates each blade 16 in the same rotational direction indicated by the arrow A. Thus, the clippings cut by blades 16 circulate in a circumferential path inside cutting chamber 60 defined by a shallow downwardly facing channel 63 in top wall 62 formed between sidewall 64 and recessed central portion 70. The circumferential path of the circulating clippings is indicated by the arrows B in FIG. 5 which show that such path is directed first towards side discharge opening 20 and then to tunnel 24 should side discharge opening 20 be closed.

There are no interior flow control baffles used in the circumferential path B that serve to separate one blade 16 from the other. This permits the clippings generated by the action of both blades 16 to smoothly merge into one common stream. The only baffle of any type used in cutting chamber 60 is a rear generally V-shaped baffle 90 at the back of cutting chamber 60 having an apex 92 that faces towards the front of cutting chamber 60.

Figure 11:
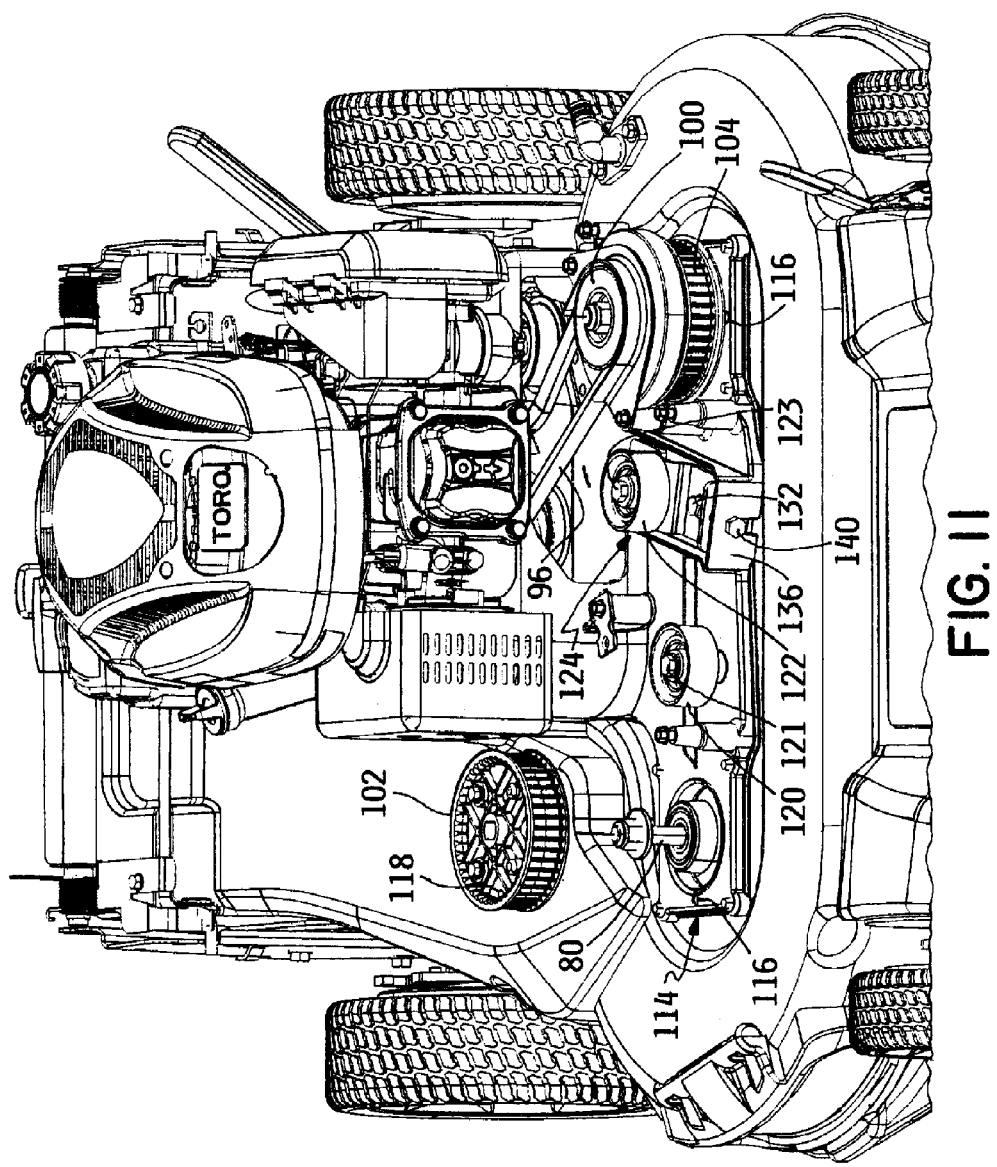
FIG. 11 is a perspective view of the blade drive system of FIG. 10, but showing one of the cogged drive pulleys in exploded form with the timing belt having been removed.

FIGS. 10 and 11 depict blade drive system 18 that powers the dual cutting blades 16 of mower 2 of this invention. Engine 14 has been removed from FIGS. 10 and 11 for the sake of clarity. However, two drive belts 94 and 96 that would be powered by the drive shaft of engine 14 are still shown in FIGS. 10 and 11. As shown in FIG. 10, drive belt 94 extends to the rear of engine deck 40 for powering the transmission (not shown) that drives rear wheels 6. As shown in FIG. 11, drive belt 96 extends to the front of engine deck 40 outwardly through an access opening 98 in the front wall of engine deck 40. As further shown in FIG. 11, drive belt 96 is entrained around a driven pulley 100 on the top of left spindle 80 to rotate the left spindle and thereby rotate left cutting blade 16. When referring to the left or right spindles or cutting blades, the adjectives left and right are used with reference to a user who is standing behind mower 2 looking forwardly.

A cogged timing pulley 102 is located on the right spindle 80 that is bolted to the right cutting blade 16. An identical cogged pulley 104 is located beneath the driven pulley 100 on the left spindle 80 for the left cutting blade 16. Both cogged pulleys 102 and 104 are located on the upper ends of spindles 80 and lie substantially immediately above apron 50 of engine mount 32. A cogged timing belt 106 passes around pulleys 102 and 104 to maintain the necessary rotational timing between spindles 80. Remember that blades 16 are to be disposed offset relative to one another by 90°. It is cogged timing belt 106 in engagement with cogged pulleys 102 and 104 that maintains this offset to ensure that blades 16 do not strike one another even though their orbits intersect.

Figure 2:
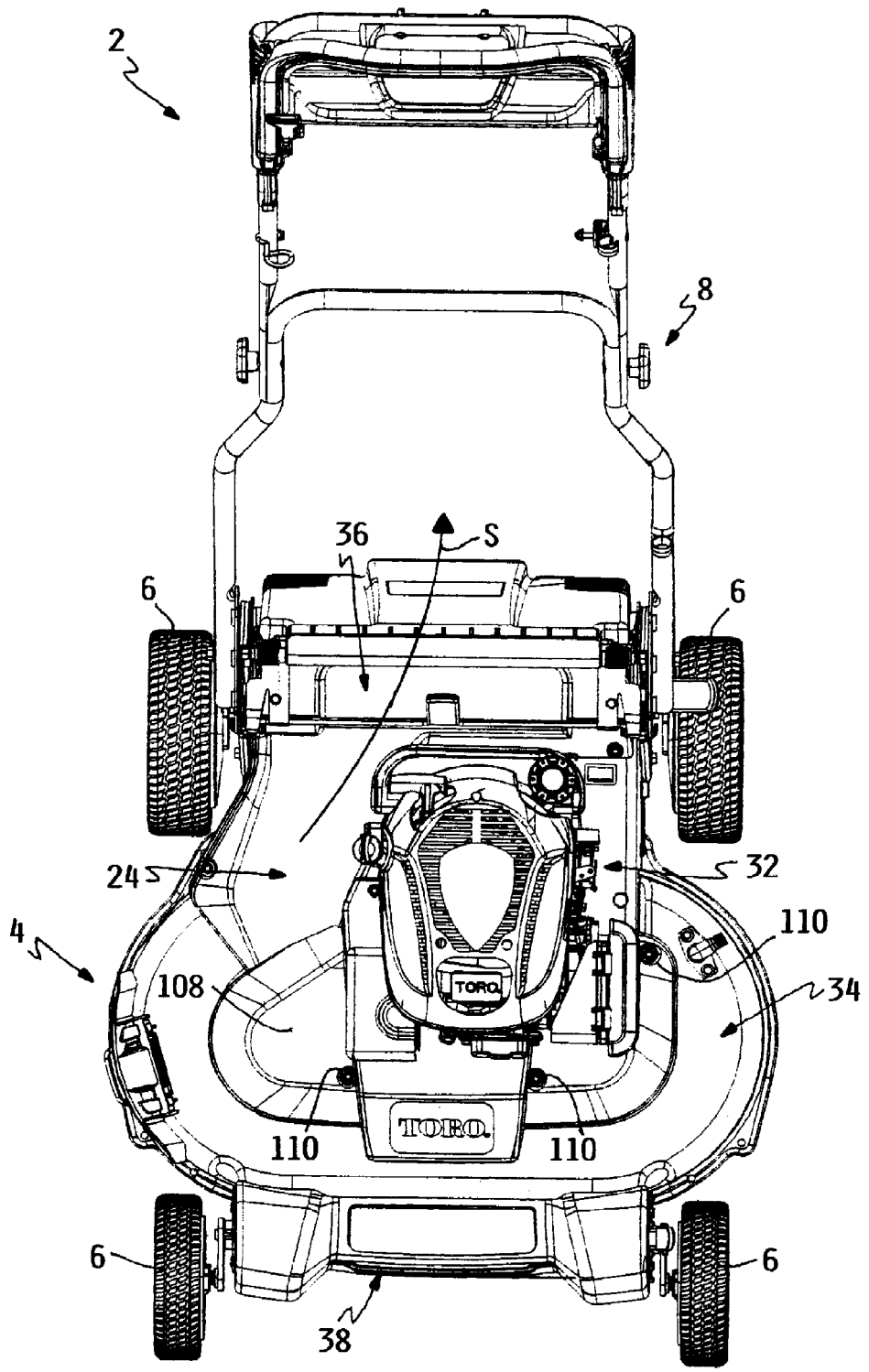
FIG. 2 is a top plan view of the mower of FIG. 1.

A belt cover 108 normally covers blade drive system 18 including both timing pulleys 102 and 104 and timing belt 106. Belt cover 108 is shown in place FIGS. 1-4 and 6 but has been removed from FIGS. 10 and 11 for the sake of clarity. Belt cover 108 is usually held in place by releasable fasteners 110 as shown in FIG. 2 that can be screwed into upwardly extending threaded bosses 112 as shown in FIG. 7 that are provided on engine mount 32.

In initially assembling mower 2 or whenever timing belt 106 needs to be replaced, a unique and easy to use locator system 114 is provided for locating timing pulleys 102 and 104 in their correct positions. As best shown in FIG. 11, locator system 114 comprises a guide hole 116 located in apron 50 of engine mount 32 adjacent each of the circular openings 42 in apron 50 through which spindles 80 extend. Guide hole 116 for opening 52 that receives the left spindle 80 is located at a 6 o'clock position while guide hole 116 for opening 52 that receives the right spindle 80 is located at a 9 o'clock position. Thus, the two guide holes 116 are offset from one another by 90°. Guide holes 116 do not extend through into cutting chamber 60 as they are blocked by an underlying portion of deck shell 34 or alternatively because they are formed only partially through the thickness of apron 50.

Each timing pulley 102 and 104 has a through hole 118 located on a radius that overlies guide holes 116. In addition, timing pulleys 102 and 104 and spindles 80 are configured so that they pulleys 102 and 104 can be installed on spindles 80 in only one orientation. Thus, the user can align through hole 118 in timing pulley 102 with guide hole 116 adjacent the opening for the right spindle 80 and then drop a pin or rod (not shown) through the aligned holes 118 and 116 to locate timing pulley 102 in exactly the correct position to hold the right cutting blade 16 at the correct orientation within cutting chamber 60. The same thing can be done with through hole 118 for timing pulley 104 for the left spindle 80 and its corresponding guide hole 116.

When this procedure is followed, both timing pulleys 102 and 104 have been simply and easily located in the correct positions so that cutting blades 16 are correctly offset 90° from one another. This avoids the user having to continually look beneath top 62 wall of shell 34 to manually and visually observe the two blades 16 and attempt to position them by hand at the required offset. The alignment of through holes 118 in timing pulleys 102 and 104 with the offset guide holes 116 provided in deck 4 and the use of a temporarily inserted bolt though the aligned sets of holes automatically does the same thing. The user can then install timing belt 106 around the timing pulleys 102 and 104 with certainty that blades 16 are in their correct offset positions. After timing belt 106 has been so installed, the bolts used to temporarily hold timing pulleys 102 and 104 in place can be pulled upwardly out of through holes 118 in timing pulleys 102 and 104.

Timing belt 106 is appropriately tensioned by passing around two idler pulleys 120 and 122 that engage the smooth backside of timing belt 106. Idler pulley 120 rotates around a fixed vertical pivot axis 121 on deck 4. However, the other idler pulley 122 rotates around a vertical pivot axis 123 that is carried on an adjustable slide 124. Slide 124 is L-shaped having a vertical front wall 126 and a rearwardly extending bottom wall 128. As best shown in FIG. 10, bottom wall 128 has a pair of slots 130 for receiving the shanks of a pair of shoulder bolts 132 that can be tightened into a pair of upwardly facing threaded apertures in apron 50 of engine mount 32 of deck 4. However, when shoulder bolts 132 are fully tightened, such bolts 132 do not clamp or lock slide 124 in place, but in conjunction with slots 130 serve as guides for the back and forth sliding motion of slide 124.

Slide 124 is contained within a U-shaped channel 134 that is a fixed part of apron 50 of engine mount 32. The front wall 136 of channel 134 is spaced away by a relatively short distance from front wall 126 of slide 124 with both front walls 126 and 136 being parallel to one another. A threaded adjustment bolt 138 has its head 140 in engagement with front wall 136 of channel 134 with the shank of bolt 138 passing through aligned openings in front walls 126 and 136 of slide 124 and channel 134, respectively. The rear end of the shank of bolt 138 is threaded to receive a threaded nut 142 located behind front wall 126 of slide 124.

The required tension in timing belt 106 can be easily set by rotating nut 142 and bolt 138 relative to one another to cause slide 124 to be slid on apron 50 in one direction or the other. If bolt 138 is rotated in one direction relative to nut 142, the rotation of bolt 138 will pull slide 124 forwardly towards front wall 126 of channel 134, thereby moving the adjustable idler pulley 122 forwardly to increase the tension in timing belt 106. Once slide 124 has been moved far enough forwardly to put enough tension on timing belt 106, the user can stop the relative rotation of bolt 138 and nut 142 to hold idler pulley 122 in its adjusted position. All of this can be done from above and from the front of deck 4 once belt cover 108 is temporarily removed since head 140 of bolt 138 and nut 142 are exposed to and easily reached by the user from above and from the front of deck 4. This makes setting the tension in timing belt 106 extremely easy.

Figure 12:
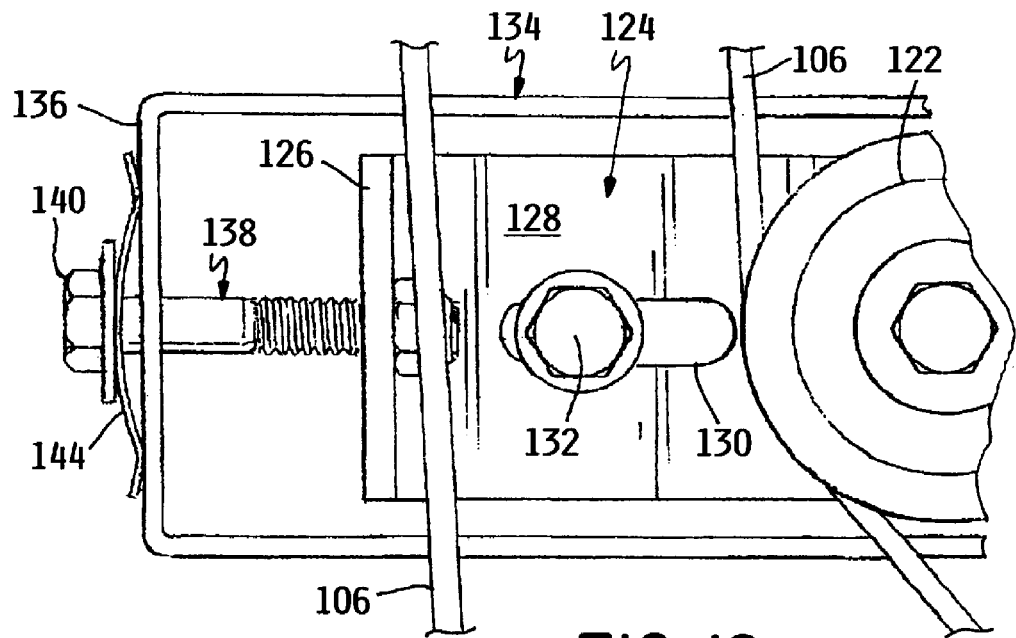
FIGS. 12 and 13 are top plan views illustrating the operation of a belt tensioning mechanism that is part of the blade drive system of FIG. 10.
Figure 13:
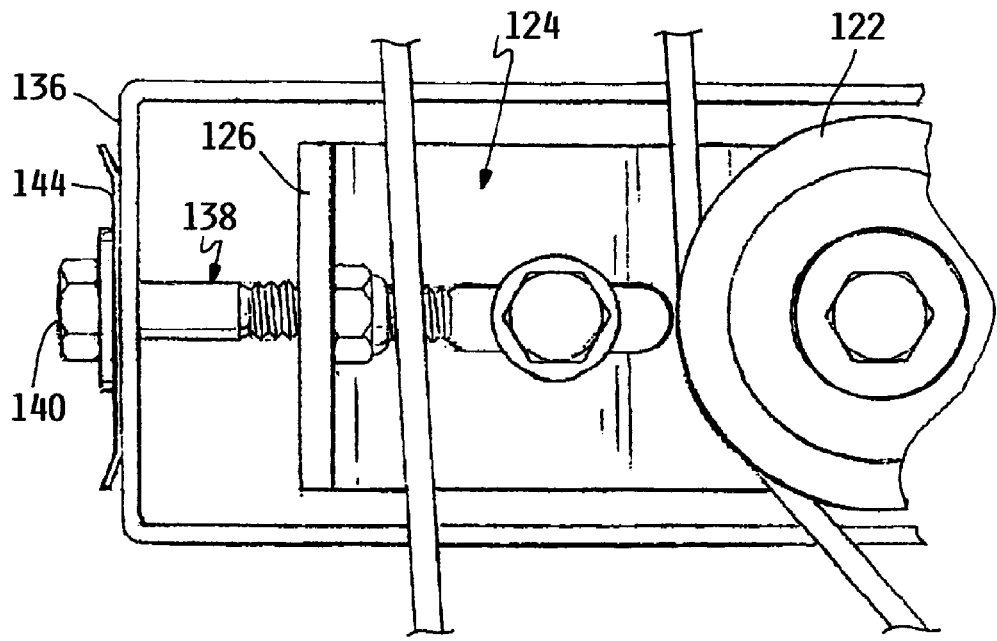

Referring now to FIGS. 12 and 13, a simple leaf spring 144 is interposed between head 140 of bolt 138 and the front side of front wall 126 of channel 134. When the tension in timing belt 106 is too loose with slide 124 being disposed too far to the rear in channel 134, leaf spring 144 will be bowed out as indicated in FIG. 12. However, as the user turns bolt 138 to draw slide 124 towards the front to increase the tension in timing belt 106, leaf spring 144 will eventually substantially flatten out to become more tightly sandwiched between head 140 of bolt 138 and front wall 126 in channel 134 as shown in FIG. 13. The force required for leaf spring 144 to substantially flatten out (i.e. being within a range of from 0.010" to 0.030" of wall 126) is chosen to correspond to the moment in time when the tension on timing belt 106 reaches the desired level. Thus, once the user sees leaf spring 144 substantially flatten out, the user knows that the tension in timing belt 106 has been adjusted to the correct level and can stop turning bolt 138. The substantial flattening out of leaf spring 144 thus forms an inexpensive, durable and easily read indicator that informs the user when timing belt tension has been correctly set.

Referring now to FIGS. 2 and 6, tunnel 24 is located on the right side of mower deck 4 and extends rearwardly to discharge the clippings into rear collection bag 26. The Applicants have found a way to provide tunnel 24 with sufficient volumetric capacity to handle the volume of grass clippings being generated by the operation of the dual side-by-side cutting blades 16. Each cutting blade 16 is slightly longer than 15" in length so that the combined swath cut by both blades is 30". Yet, tunnel 24 still fits atop deck 4 without protruding beyond the sides of shell 34 of deck 4. Thus, the sides of deck 4 can still closely abut up to obstacles, such as the edges of a flower bed, since the wheels of mower 2 are also inset from the extreme outermost edges of the sides of deck 4. Thus, mower 2 of this invention handles like a conventional smaller sized consumer mower having a rear bagging mode, yet cuts 50% more grass on each swath of mower 2. This is a significant advance in the art.

Figure 9:
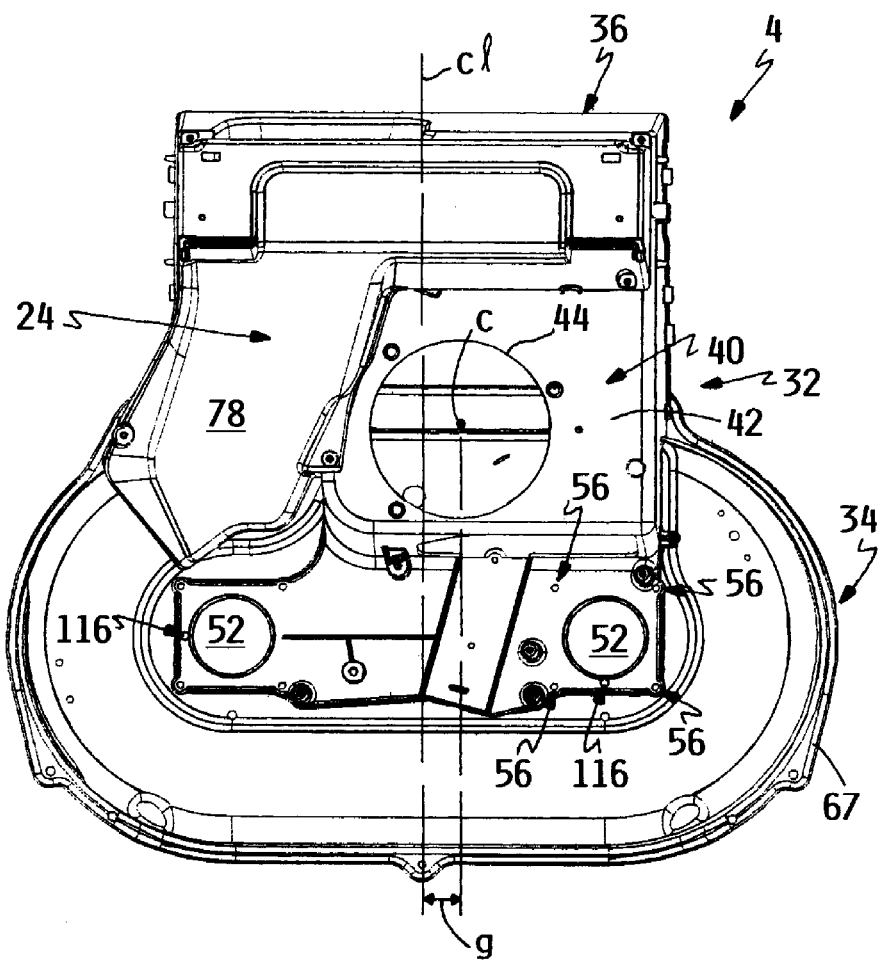
FIG. 9 is a top plan view of the mower deck of FIG. 7.

A number of factors help provide mower 2 of this invention with the ability to use a single tunnel 24 to collect the clippings from two cutting blades 16 that provide a significant increase in the width of cut with such single tunnel lying on or inboard of the side edges of the mower deck and with such single tunnel discharging the clippings to the rear of the mower deck. First, as best shown in FIG. 9, engine 14 has been shifted off center to the left of the longitudinal centerline $c_1$ of deck 4 by a distance of 1.7 inches. This offset is indicated in FIG. 9 by the gap g between centerline $c_1$ and the axis of the drive shaft of engine 14 which drive shaft axis will be aligned with the center c of opening 44 in the top wall 42 of engine deck 40. This shift of engine 14 to the left of more deck provides more space for a wider tunnel 24 on the right of mower deck 4.

Second, as also shown in FIG. 9 as well as FIGS. 10 and 11, blade drive system 18 has been configured so that most of the components thereof are also located on the left side of mower deck 4 to the left of centerline $c_1$. For example, drive belt 96 that extends to driven pulley 100, spindle 80 for the left cutting blade 16 and timing pulley 104 for such spindle 80, the adjustable idler pulley 122 and the adjustable slide 124 that mounts pulley 122 are all on the side of mower deck 4 that is away tunnel 24. Only, the fixed idler pulley 120 and the spindle 80 for the right cutting blade along with timing pulley 102 are located on the right of mower deck 4 to the right of centerline $c_1$. This minimizes the space taken up on the right or tunnel side of mower deck 4 by blade drive system 18. Thus, as shown in FIG. 2, belt cover 108 is much smaller in a fore and aft direction on the tunnel side of mower deck 4 than on the non-tunnel side of mower deck 4, thereby allowing tunnel 24 to extend further forwardly on mower deck 4 than would have been the case if drive belt 96 or the idler pulley 122 and slide 124 had been reversed in their positions.

Figure 3:
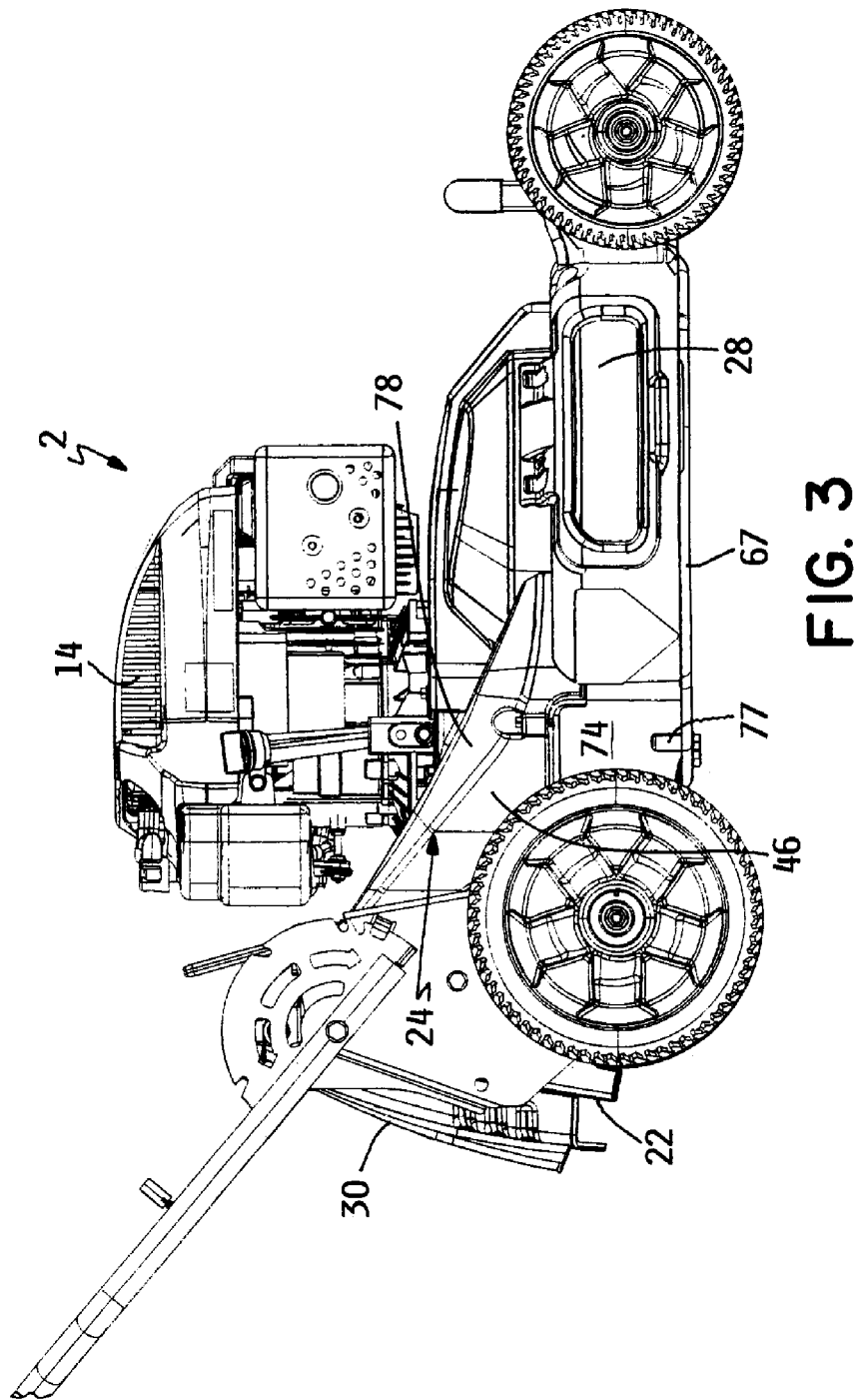
FIG. 3 is a side elevational view of the mower of FIG. 1.
Figure 4:
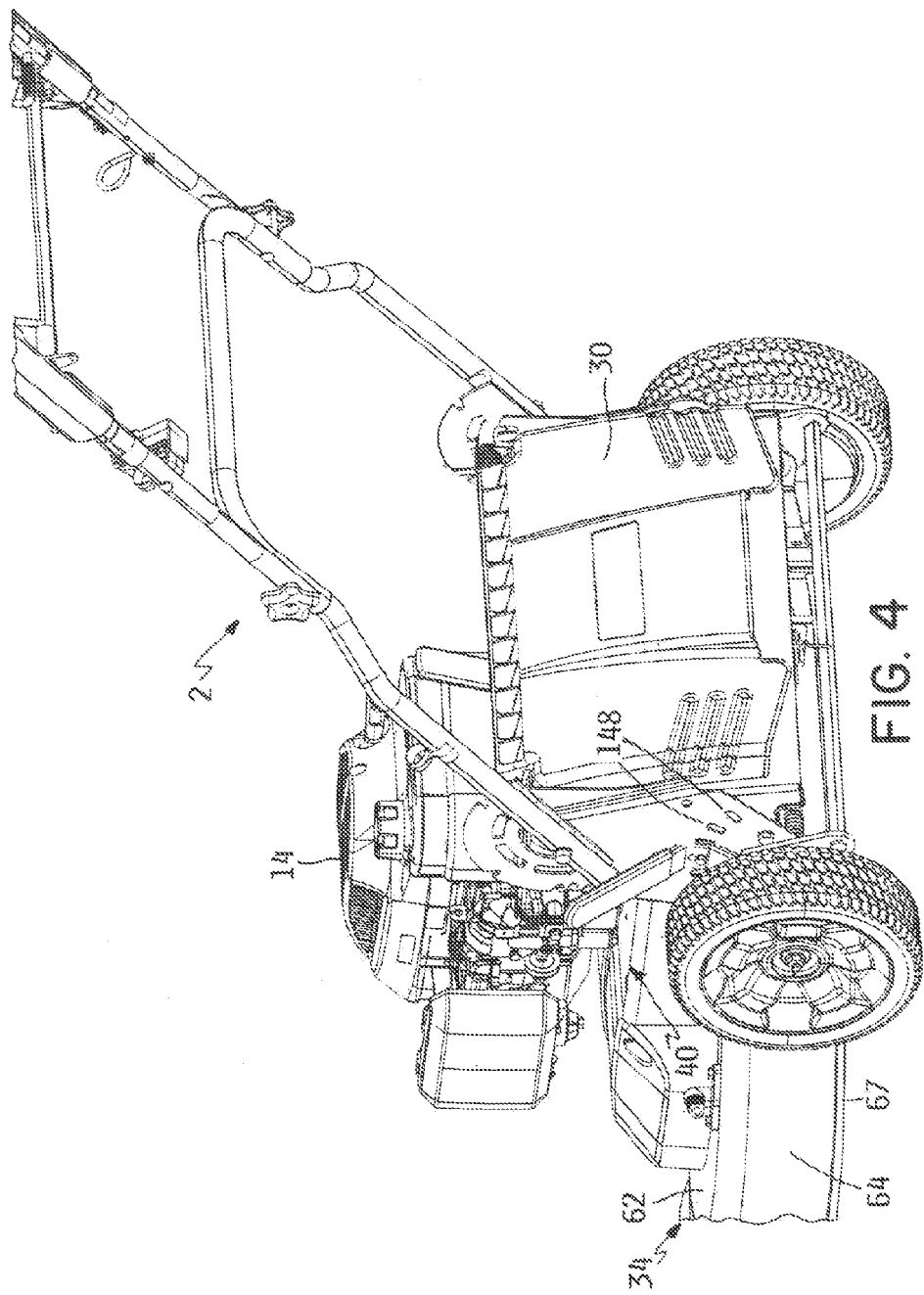
FIG. 4 is a rear perspective view of the mower of FIG. 1.

Thirdly, as best shown in FIG. 3, tunnel 24 progressively increases in height as it extends rearwardly. Moreover, tunnel 24 increases in width as it extends rearwardly as indicated by the inclined innermost sidewall 48 of engine deck 40. This gets as much volume as possible into tunnel 24. All of these factors contribute to the use of a single tunnel 24 for discharging grass clippings to the rear in the manner of a typical walk power mower having rear bagging capability, though one or more of the factors could potentially be dropped. The most important of the factors is offsetting the engine somewhat to the non-tunnel side of mower deck 4 to provide more absolute space of tunnel 24.

While use of a single tunnel 24 has been described above in an embodiment in which two side-by-side cutting blades are positioned to have intersecting orbits, blades 16 could alternatively be positioned in a side-by-side arrangement in which blades 16 are longitudinally staggered to have non-intersecting orbits that still overlap one another in the middle. In this alternative arrangement, the right side of the orbit of one blade will lie behind or in front of the left side of the orbit of the other blade to ensure that no uncut grass is left in the middle of the swath even though the orbits never cross one another. The factors noted above contributing to the use of a single, rearwardly extending grass discharge tunnel 24 on a mower could still be employed on a mower having this alternative arrangement of side-by-side cutting blades 16. However, the alternative arrangement is slightly less preferred than the embodiment specifically described herein as it increases the front to back length of mower deck 4.

Figure 14:
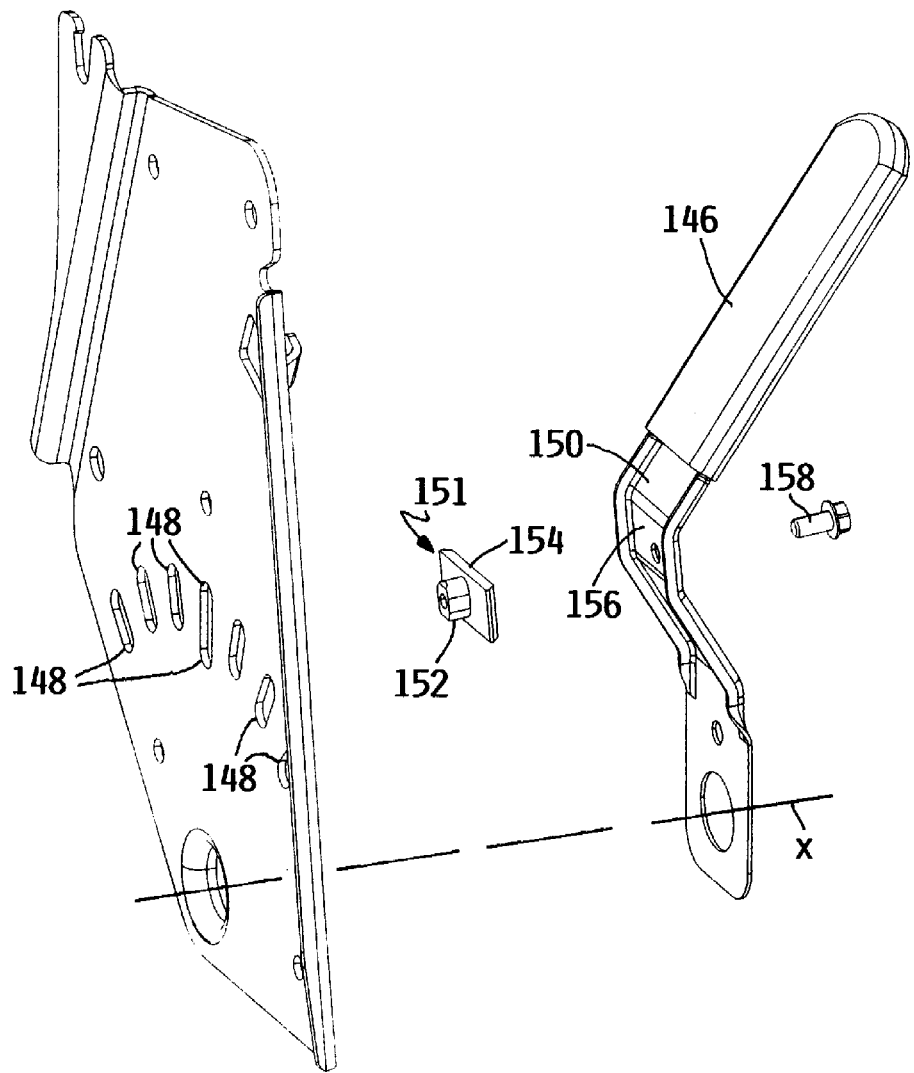
FIG. 14 is an exploded perspective view of a portion of a height of cut adjustment device for the mower of FIG. 1, particularly illustrating a removable insert forming a locking pin used on a locking spring arm in the height of cut adjustment device.

Referring now to FIG. 14, mower 2 of this invention employs a generally conventional height of cut adjustment system that adjusts the height of wheels 6 up and down relative to mower deck 4 to change the height of blades 16 above the ground. The height of cut adjustment system that is employed is one that uses at least one pivotal spring arm 146 that pivots about a horizontal pivot axis x relative to a series of notches, detents or openings 148 that are provided on mower deck 4. Spring arm 146 is linked to at least one and possibly more than one of the wheels 6 so that pivotal motion of spring arm 146 about pivot axis x lifts or lowers the axle of the wheel(s) 6 relative to mower deck 4 to move mower deck 4, and thus cutting blades 16, upwardly or downwardly relative to ground. In prior art systems of this kind, the spring arm carries an integrally formed locking pin or tab that engages with one of the series of notches, detents or openings to hold the wheel or wheels 6 in an adjusted position.

As shown in FIG. 14, spring arm 146 according to this invention employs a channel 150 on the back thereof, i.e. on that part of spring arm 146 that faces notches, detents or openings 148. A removable insert 151 is provided comprising a locking pin or tab 152 that is formed with and projects from one side of a base 154. Base 154 is shaped to be received closely within the confines of channel 150 on a flat portion 156 of channel 150. An attachment screw 158 is used to releasably attach base 154 of insert 151 to channel 150 of spring arm 146 with locking pin or tab 152 suited to be received in any one of the notches, detents or openings 148. Thus, if mower 2 hits an obstacle and a shear load is imposed on locking pin or tab 152 that would tend to break off pin or tab 152, the user need only replace insert 151 rather than replacing the entire spring arm 146. This is advantageous as it will be significantly less costly and easier to replace insert 151 instead of having to replace the complete spring arm 146.

Figure 15:
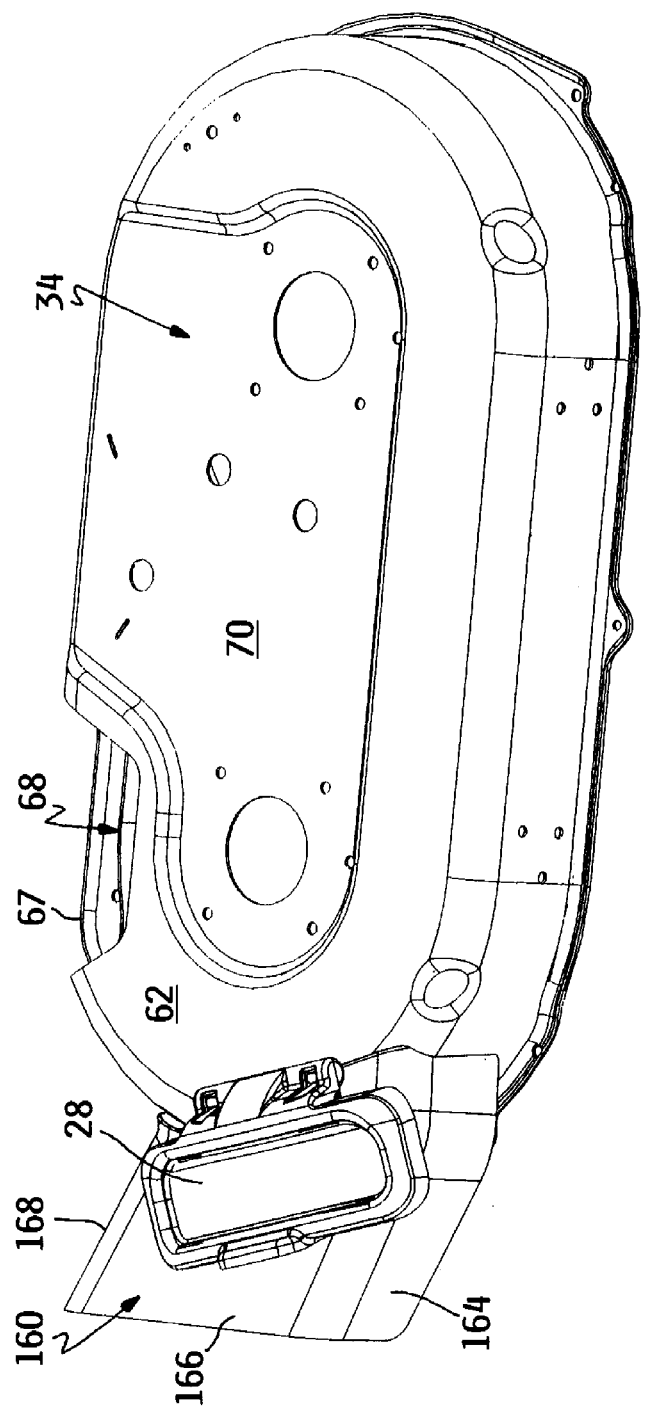
FIG. 15 is a front perspective view of the deck shell of the mower deck of the mower of FIG. 1, particularly illustrating a side discharge chute having been installed on a side discharge opening on the deck shell.
Figure 16:
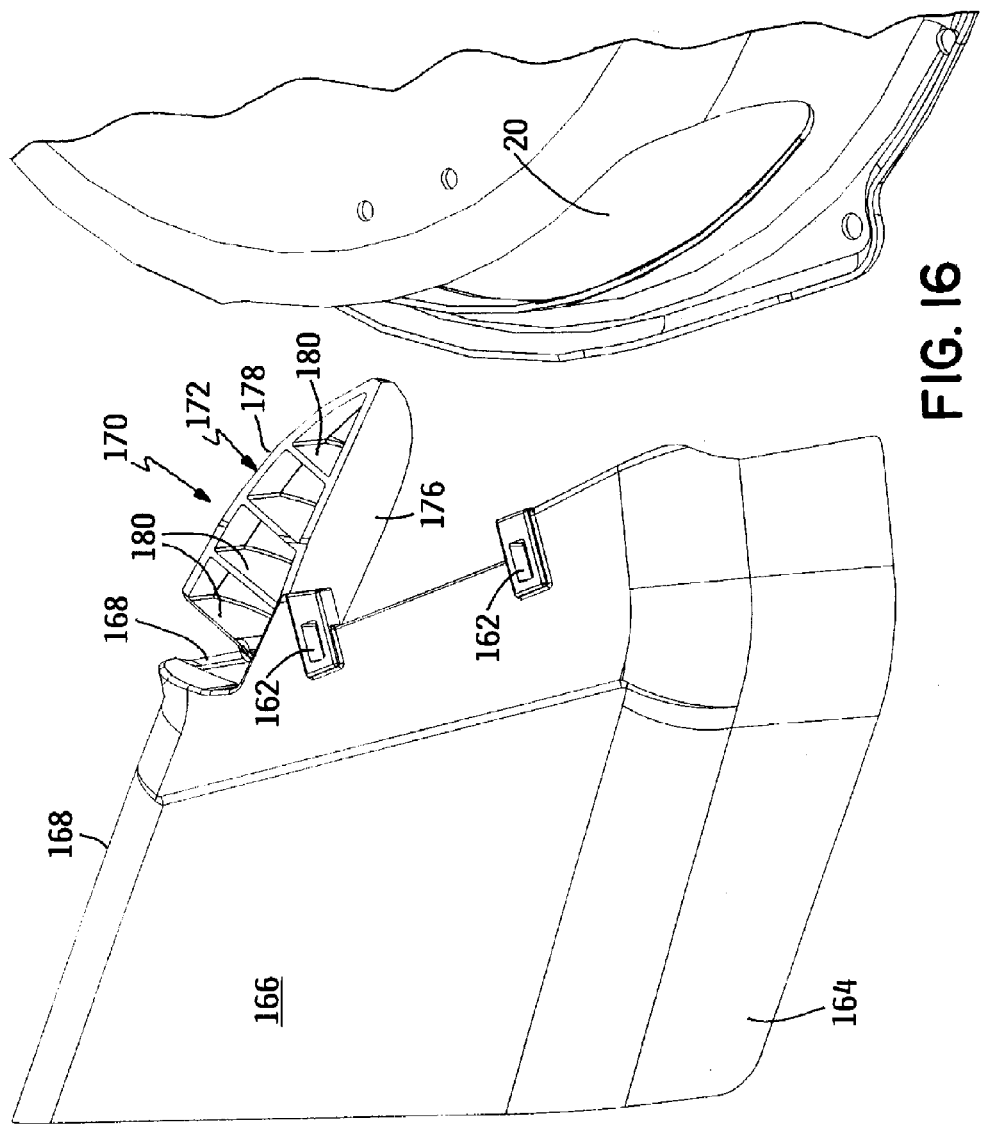
FIG. 16 is an enlarged perspective view of the side discharge chute of FIG. 15, particularly illustrating the chute in an exploded orientation relative to the side discharge opening with a flow cutoff baffle being carried on the chute adjacent a rear wall of the chute.

Finally, turning to FIGS. 15-19, an improved side discharge chute 160 is shown for use with side discharge opening 20. Chute 160 is releasably mounted to mower deck 4 to extend away from side discharge opening 20 and to cause the clippings exiting from side discharge opening 20 to be thrown safely to the side of mower deck 4. Chute 160 is mounted to mower deck 4 after side door 28 is first pivoted upwardly as shown in FIG. 15. Various ways of attaching chute 160 to deck 4 can be used, such as holes or apertures 162 that can be dropped over pins or tabs (not shown) on mower deck 4. See FIG. 16 in which chute 160 has been pulled away from deck 4 and side door 28 has been removed.

As is typical of side discharge chutes, chute 160 of this invention is U-shaped with a front wall 164, a top wall 166, and a rear wall 168 that together form the U-shape. It is obvious that the U-shape provided by chute 160 faces downwardly towards the ground. The front wall 164 and the rear wall 168 have been so named because front wall 164 is the first to see clippings that are passing through side discharge opening 20 and rear wall 168 is the last to see such clippings.

Put another way, front wall 164 is upstream from rear wall 168 taken with respect to the direction B in which the clippings are circulating within cutting chamber 60 past side discharge opening 20.

Referring more particularly to FIGS. 15-19, chute 160 of this invention includes a flow cutoff baffle 170 that is located substantially along rear wall 168 of chute 160. Baffle 170 has an inner end 172 that protrudes inwardly from an inboard side of chute 160 to stick inwardly through side discharge opening 20 when chute 160 is attached to deck 4. Baffle 170 has an outer end 174 that is releasably attached by a pair of screws 177 to chute 160. See FIG. 18.

Figure 17:
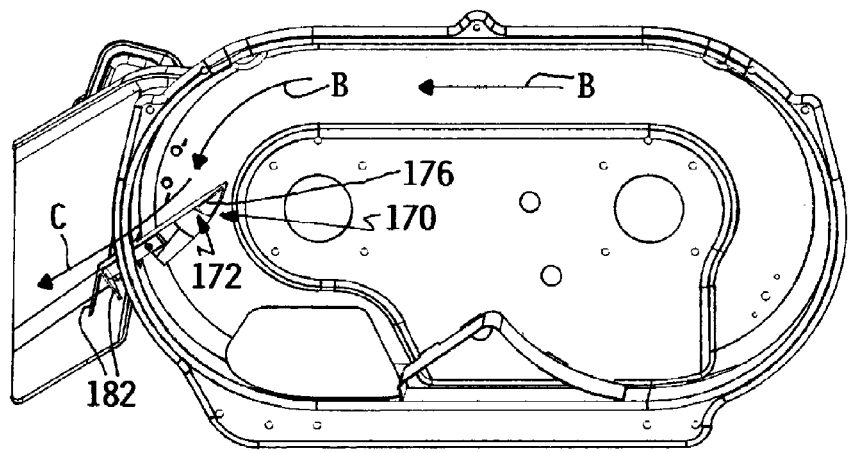
FIG. 17 is a bottom plan view of the deck shell of FIG. 15, particularly illustrating the side discharge chute in place on the deck shell with the flow cutoff baffle extending inwardly through the side discharge opening into a portion of the cutting chamber.
Figure 18:
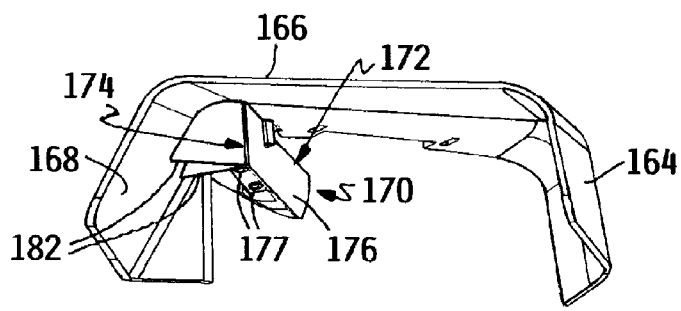
FIG. 18 is a perspective view of the side discharge chute of FIG. 15 looking inwardly from an outboard side to an inboard side of the chute.
Figure 19:
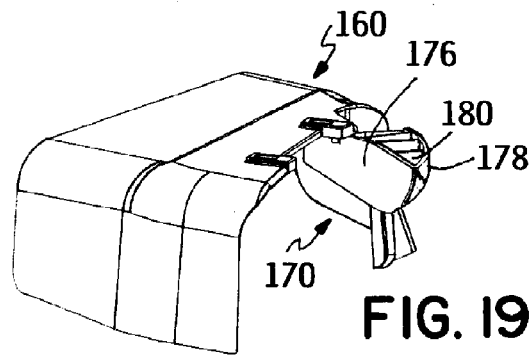
FIG. 19 is a perspective view of the side discharge chute of FIG. 15 looking outwardly from an inboard side to an outboard side of the chute.

As best shown in FIG. 17, when chute 160 is in place, inner end 172 of baffle 170 protrudes into the path B of the clippings circulating within channel 63 of cutting chamber 60. Inner end 172 of baffle 170 is also obviously above the plane of rotation of blades 16 to avoid being struck by the blade 16 that is nearest to baffle 170 as inner end 172 of baffle 170 partially overlies the orbit of that nearest blade. The inner end 172 of baffle 170 has a substantially front face 176 that serves to intercept the clippings and assist the clippings into passing through side discharge opening 20 into chute 160. This helps improve side discharge efficiency by greatly decreasing the amount of clippings that might miss side discharge opening 20 to keep circulating within cutting chamber 60. This increase in efficiency helps improve how far the clippings are thrown to the side from deck 4.

Baffle 170 is formed as an integral one-piece plastic part. Baffle 172 has a three dimensional shape with inner end 172 having a rear face 178 behind front face 176 with a number of bracing ribs 180 extending between the two faces 176 and 180. See FIG. 16. In addition, outer end 174 of baffle 170 has a pair of ribs 182 arranged in a V-shape that further brace baffle 170 against the top and rear walls 166 and 168 of chute 160. This structure helps baffle 170 resist impacts from any foreign objects, such as rocks or other debris, which might be picked up and carried with the clippings to resist being damaged or bent from such impact. However, should baffle 170 be damaged, it is easily replaceable as it is releasably attached to chute 160.

Chute 160 of this invention incorporates flow cutoff baffle 170 thereon so that it is in place only when chute 160 is in place after the user has selected the side discharge mode of operation. If chute 160 is taken off and side door 28 is closed to block side discharge opening 20, baffle 170 is gone as it is not a permanent part of mower deck 4. Thus, baffle 170 does not hinder or prevent operation of mower 2 it the mulching or rear bagging modes of operation, as it would had baffle 170 been made part of mower deck 4 instead of being carried on chute 160.

Various modifications of this invention will be apparent to those skilled in the art. While an internal combustion engine 14 has been shown as the power source herein, other power sources, e.g. an electric motor powered by some source of electrical energy, could be used. Similarly, the pivotal side door 28 used to open and close side discharge opening 20 could be replaced by an installable and removable blocking plate. Rather than using cogged pulleys engaged by a cogged belt, one could use cogged sprockets engaged by a cogged chain in which the cogs are formed by the links in the chain. Thus, the scope of this invention will be limited only by the appended claims.

The invention claimed is:
1. A walk power mower, which comprises:
    (a) a mower deck having at least one rotary cutting blade;
    (b) a plurality of ground engaging wheels carried on the mower deck for supporting the mower deck for rolling over the ground;
    (c) an upwardly and rearwardly extending handle assembly carried on the mower deck to permit an operator who is walking on the ground behind the mower deck to grip the handle assembly to guide and manipulate the mower deck during movement of the mower deck;
    (d) a power source carried atop the mower deck for rotating the cutting blades; and
    (e) a height of cut adjustment system for raising and lowering the wheels on the mower deck to adjust how far the at least one rotary cutting blade is positioned above the ground, the height of cut adjustment system comprising:
        (i) a plurality of notches, detents or openings provided on the mower deck;
        (ii) at least one spring arm that is resiliently biased towards the mower deck to move a locking pin or tab on the spring arm into engagement with a selected one of the notches, detents or openings with the height of cut being determined by which notch, detent or opening has been engaged by the locking pin or tab, wherein the spring arm has an inner side that faces the detents, notches or openings with the inner side of the spring arm having a substantially flat portion, wherein the locking pin or tab is formed with and projects from one side of a substantially flat base that is mounted against the substantially flat portion of the inner side of the spring arm, wherein the substantially flat portion of the inner side of the spring arm comprises a substantially flat vertical wall having inturned side edges to form a shallow channel that faces inwardly towards the notches, detents or openings, and wherein the base that carries the locking pin or tab is shaped to be received closely within the channel with the base having a lateral width between opposite sides thereof which is approximately equal to but slightly less than a lateral distance between the side edges of the channel such that the opposite sides of the base are substantially directly contiguous to the side edges of the channel when the base is received within the channel; and
        (iii) wherein the locking pin or tab is releasably coupled by an elongated, substantially horizontal, threaded fastener to the spring arm such that the locking pin or tab can be replaced on the spring arm if the locking pin or tab is damaged without having to replace the spring arm, the substantially directly contiguous side edges of the channel and the opposite sides of the base being straight and in a substantially abutting engagement with one another when the base is received in the channel to non-rotatably hold the base within the channel when the base is received in the channel such that rotation of the threaded fastener in opposite directions is effective to clamp and unclamp, respectively, the base within the channel instead of rotating the base relative to the channel.

2. The mower of claim 1, wherein the lateral width of the base that carries the locking pin or tab substantially exceeds a lateral width of the locking pin or tab.

3. The mower of claim 1, wherein the spring arm has a substantially horizontal hole that passes through a thickness of the spring arm between an outer side of the spring arm and the inner side of the spring arm with the hole being located on the substantially flat portion on the inner side of the spring arm, and wherein the threaded fastener passes inwardly from the exterior side of the spring arm, through the hole in the spring arm and into the base that carries the locking pin or tab to releasably couple the locking pin or tab to the spring arm.

* * * * *